(12) United States Patent
Bartolucci et al.

(10) Patent No.: US 10,364,093 B2
(45) Date of Patent: Jul. 30, 2019

(54) APPARATUS AND METHOD FOR DISPENSING A METERED DOSE OF A PRODUCT

(71) Applicant: The Procter & Gamble Company, Cincinnati, OH (US)

(72) Inventors: Stefano Bartolucci, Singapore (SG); Paul Owen Nutley, West Chester, OH (US); Nathan Daniel Grubbs, Cincinnati, OH (US)

(73) Assignee: The Procter and Gamble Company, Cincinnati, OH (US)

( * ) Notice: Subject to any disclaimer, the term of this patent is extended or adjusted under 35 U.S.C. 154(b) by 0 days.

(21) Appl. No.: 16/118,663

(22) Filed: Aug. 31, 2018

(65) Prior Publication Data

US 2019/0071242 A1 Mar. 7, 2019

(30) Foreign Application Priority Data

Sep. 1, 2017 (EP) .................................. 17189053

(51) Int. Cl.
*B65D 83/20* (2006.01)
*B65D 83/54* (2006.01)
*G01F 11/08* (2006.01)

(52) U.S. Cl.
CPC .......... *B65D 83/54* (2013.01); *B65D 83/206* (2013.01); *B65D 83/546* (2013.01); *G01F 11/088* (2013.01)

(58) Field of Classification Search
CPC .... B65D 83/54; B65D 83/206; B65D 83/546; G01F 11/02

(Continued)

(56) References Cited

U.S. PATENT DOCUMENTS 3,104,785 A * 9/1963 Beard, Jr. ............ B65D 83/425
  222/207
3,235,135 A * 2/1966 Blanie .................... B65D 83/54
  222/107

(Continued)

FOREIGN PATENT DOCUMENTS

DE 3147004 A1 5/1983
FR 1454371 A 9/1966

(Continued)

OTHER PUBLICATIONS

All final and non-final office actions for U.S. Appl. No. 15/926,075.

(Continued)

*Primary Examiner* — Patrick M. Buechner
*Assistant Examiner* — Michael J. Melaragno
(74) *Attorney, Agent, or Firm* — Alexandra S. Anoff

(57) ABSTRACT

An apparatus for dispensing a metered dose of a product, and a method for using the apparatus. The dispensing device has a charging configuration in which an outlet (112; 212) is closed and a metering chamber (120; 220) is configured to expand to its expanded configuration while receiving product through an inlet (111; 211). It also has a discharging configuration in which the outlet (112; 212) is open and the metering chamber (120; 220) is configured to contract to its contracted configuration while expelling the received product through the outlet (112; 212), thereby dispensing a metered dose of product. The dispensing device further comprises a latch mechanism (140; 240), configured to retain the dispensing device in the charging configuration until the metering chamber (120; 220) attains its expanded configuration. The method comprises actuating an actuator (130; 230) of the dispensing device, to fill the metering chamber, and releasing the actuator to dispense the metered dose of product.

15 Claims, 6 Drawing Sheets

(58) Field of Classification Search
USPC .............................................. 222/402, 402.2
See application file for complete search history.

(56) References Cited

U.S. PATENT DOCUMENTS

| | | | |
|---|---|---|---|
| 3,247,640 A | 4/1966 | De Wayne Miles, et al. | |
| 3,250,444 A * | 5/1966 | Ward | B65D 83/20 222/402.2 |
| 3,377,004 A * | 4/1968 | Kjelson | B65D 83/54 222/402.2 |
| 3,981,419 A | 9/1976 | Nilson | |
| 4,433,797 A * | 2/1984 | Galia | G01F 11/086 222/207 |
| 4,592,743 A | 6/1986 | Hjertman et al. | |
| 4,892,232 A * | 1/1990 | Martin | B65D 83/54 222/207 |
| 4,896,832 A | 1/1990 | Howlett | |
| 4,919,312 A * | 4/1990 | Beard | B65D 83/54 222/107 |
| 4,941,598 A | 7/1990 | Lambelet, Jr. et al. | |
| 5,031,802 A | 7/1991 | Joulia | |
| 5,105,995 A * | 4/1992 | Martin | B65D 83/54 128/200.14 |
| 5,199,616 A * | 4/1993 | Martin | B65D 83/425 222/402.16 |
| 5,429,280 A | 7/1995 | Bauer et al. | |
| 5,520,310 A | 5/1996 | Bauer et al. | |
| 5,875,927 A * | 3/1999 | D'Andrade | F41B 9/0012 222/183 |
| 5,904,274 A * | 5/1999 | Warby | B65D 83/54 222/402.2 |
| 6,095,182 A * | 8/2000 | Warby | B65D 83/54 137/375 |
| 6,405,898 B1 | 6/2002 | O'Connor et al. | |
| 7,104,424 B2 * | 9/2006 | Kolanus | B65D 83/206 177/245 |
| 7,306,123 B2 | 12/2007 | Masuda | |
| 7,306,124 B2 | 12/2007 | Masuda | |
| 7,665,923 B2 | 2/2010 | Py et al. | |
| 8,006,868 B2 | 8/2011 | Geiberger et al. | |
| 9,403,636 B2 | 8/2016 | Bodet et al. | |
| 9,469,468 B2 * | 10/2016 | Shibata | B65D 83/48 |
| 10,022,740 B2 | 7/2018 | Van Swieten et al. | |
| 2006/0196889 A1 | 9/2006 | Masuda | |
| 2007/0095853 A1 * | 5/2007 | Bonney | B05B 11/3056 222/21 |
| 2007/0125799 A1 * | 6/2007 | Bonney | B05B 11/3004 222/21 |
| 2007/0137643 A1 * | 6/2007 | Bonney | B05B 11/3056 128/200.23 |
| 2007/0164049 A1 * | 7/2007 | Bonney | B05B 11/3056 222/162 |
| 2007/0175917 A1 * | 8/2007 | Bonney | B05B 11/0064 222/14 |
| 2008/0061083 A1 | 3/2008 | Masuda | |
| 2008/0149098 A1 * | 6/2008 | Bonney | B05B 11/3056 128/200.22 |
| 2008/0272144 A1 * | 11/2008 | Bonney | A61M 15/009 222/71 |
| 2010/0308082 A1 * | 12/2010 | Lamble | A61M 15/009 222/162 |
| 2011/0011889 A1 * | 1/2011 | Bonney | B05B 11/3056 222/71 |
| 2013/0019802 A1 | 1/2013 | Leck | |
| 2013/0068119 A1 * | 3/2013 | Kennedy | A45D 40/02 101/364 |

FOREIGN PATENT DOCUMENTS

| | | | |
|---|---|---|---|
| FR | 2311593 A1 | 12/1976 | |
| FR | 2990421 B1 | 2/2015 | |
| GB | 1414637 A | 11/1975 | |
| WO | WO2004045778 A1 | 6/2004 | |

OTHER PUBLICATIONS

All final and non-final office actions for U.S. Appl. No. 16/184,367.
All final and non-final office actions for U.S. Appl. No. 16/194,502.
European Search Report for 17162178.2 dated Aug. 21, 2017.
European Search Report for EP 17175852.7 dated Sep. 19, 2017.
European Search Report for EP 17189053.6 dated Feb. 28, 2018.
European Search Report for EP 17203315.1 dated Apr. 5, 2018.
U.S. Appl. No. 16/184,367, filed Nov. 8, 2018, Bartolucci et al.
U.S. Appl. No. 16/194,502, filed Nov. 19, 2018, Bartolucci et al.

* cited by examiner

APPARATUS AND METHOD FOR DISPENSING A METERED DOSE OF A PRODUCT

FIELD OF THE INVENTION

The present invention relates to dispensing devices for products. In particular, it relates to dispensing devices for foamable products, especially foamable personal care products.

BACKGROUND OF THE INVENTION

Dispensing devices for dispensing a foamable product from a container are known in the art. In one example, the dispensing device is disposed on top of a pressurized container containing a foamable product. The dispensing device comprises a flow passage that is coupled at one end to a discharge valve of the pressurized container. A discharge outlet is provided at the other end of the flow passage. To dispense the foamable product, the user presses an actuator part of the dispensing device. This opens the discharge valve of the container. Product then flows into the flow passage and is discharged through the discharge outlet. This discharge occurring from the discharge outlet is driven by the flow of foamable product entering the flow passage from the container, propelled by the vapor pressure of the propellant in the container. The foamable product also expands into a foam within the flow passage as it is being dispensed, such that the volumetric flow rate at the discharge outlet is greater than that at the discharge valve of the container.

After a desired amount of foam has been dispensed, the user releases the actuator, closing the discharge valve of the container, and thereby shutting off the supply of product to the flow passage. In this way, the user can control the amount of foam that is dispensed according to the length of time for which the actuator is held pressed.

SUMMARY OF THE INVENTION

The invention is defined by the claims. According to one aspect of the invention there is provided a dispensing device for dispensing a metered dose of a product, the dispensing device comprising:
a dispensing channel, the dispensing channel having:
an inlet for communicating with a valve-element of a container containing the product; and
an outlet for dispensing the product; and
a variable-volume metering chamber in fluid communication with the dispensing channel,
the metering chamber having an expanded configuration in which it has a first predetermined volume and a contracted configuration in which it has a second predetermined volume, wherein the first predetermined volume is larger than the second predetermined volume, the metering chamber being biased toward the contracted configuration,
wherein the dispensing device has:
a charging configuration in which the outlet is closed and the metering chamber is configured to expand to its expanded configuration while receiving product through the inlet; and
a discharging configuration in which the outlet is open and the metering chamber is configured to contract to its contracted configuration while expelling the received product through the outlet, thereby dispensing a metered dose of product, the metered dose being determined by a difference between the first predetermined volume and the second predetermined volume,
the dispensing device further comprising an actuator,
the dispensing device further comprising a latch mechanism, configured to retain the dispensing device in the charging configuration until the metering chamber attains its expanded configuration.

This dispensing device can allow a metered dose of product to be dispensed, such that a volume of product dispensed is (at least approximately) consistent at substantially every dispensing event. This avoids the need for the user to determine arbitrarily the desired amount of product that should be dispensed, and also avoids the need for the user to control the actuator carefully so as to dispense this desired amount. It reduces the likelihood that the user will dispense and/or use too much or too little of the product. It can also reduce the need to actuate multiple times, in cases where the user has dispensed too little of the product upon the first actuation of the dispensing device. The metered dose can be made approximately constant for different dispensing events initiated by the same user, as well as across different users.

The change in volume between the expanded and contracted configurations of the metering chamber can enable convenient metering of the dose of product by volume.

The product is preferably flowable—that is, able to flow. Flowable products may include fluids, such as liquids and/or gases. They may also include solid materials under some circumstances—for example, solid materials in particulate form, optionally dispersed in a liquid (as in a suspension or sol) or gas (as in an aerosol). Preferably, the product is a foamable product.

The metering chamber is preferably resiliently biased toward the contracted configuration.

The actuator is preferably configured such that actuation of the actuator places the dispensing device in the charging configuration.

The latch mechanism helps to ensure more reliable, consistent metering of the dose. It ensures that the dispensing device is not switched from the charging configuration to the discharging configuration until the metering chamber has reached its expanded configuration.

Without the latch, the user could release the actuator early (that is, before the metering chamber had completely filled with product) and the device would switch to the discharging configuration immediately. It would then dispense whatever amount of product had so far accumulated in the metering chamber. Thus, the metering chamber would only operate to set an upper limit on the amount of product that could be discharged in one dose. There would be no lower limit—an arbitrarily small dose could be dispensed.

The release of the latch mechanism may be accompanied by an audible sound or a vibration, for alerting the user that the metering chamber has attained the expanded configuration. If the user is still holding the actuator, this can indicate to the user that the actuator can now be released—indeed, it can remind the user that the actuator must now be released in order to dispense the product from the metering chamber.

The dispensing device preferably comprises a valve between the metering chamber and the outlet, for closing the outlet in the charging configuration of the dispensing device.

The valve optionally comprises: a flexible membrane forming at least a portion of a wall of the dispensing channel; and a gate member, the gate member having: a closed configuration in which it presses the flexible membrane into the dispensing channel to thereby obstruct the flow of product; and an open configuration, in which product can flow through the valve.

The use of a flexible membrane or diaphragm in the wall of the dispensing channel has been found to be one effective way to close off the outlet of the dispensing channel while the metering chamber is filling. A good seal is desirable, because the valve of the container is open in this configuration of the dispensing device, and therefore the dispensing channel is pressurized to the dispensing pressure of the container (that is, the vapor pressure of the propellant).

The gate member preferably interferes with the flexible membrane to constrict the dispensing channel. That is, the gate member preferably pinches the dispensing channel closed.

In some embodiments, the flexible membrane may be provided at one side of the dispensing channel, with a hard wall at the opposite side. In this case, the gate member may press the flexible membrane against the interior surface of the opposing hard wall. The gate member may be shaped to match the shape of this interior surface. This can help it to press the flexible membrane tightly against the wall. The gate member may have a rounded edge. This may help to avoid damage to the flexible membrane.

In other embodiments, the flexible membrane may be provided as a tube defining a segment of the dispensing channel. In this case, the tube may be pinched between the gate member and another member to close the dispensing channel.

The gate member is preferably made of stiffer material than the flexible membrane. Likewise, in the case of a tube pinched between the gate member and another member, both the gate member and the other member are preferably stiffer than the tube formed by the flexible membrane. This can help to ensure that the flexible membrane is deformed during contact with the gate member, while the gate member is substantially not deformed.

The gate member may be coupled to the actuator to close the outlet when the actuator is actuated. The flexible membrane preferably comprises an elastomeric material.

In some embodiments, the valve may comprise: a stem arranged to project into the dispensing channel, the stem having a foot; and a seat for the foot inside the dispensing channel, the stem having: a closed configuration, in which the foot projects into the dispensing channel and engages with the seat to thereby obstruct the flow of product to the outlet; and an open configuration, in which the foot is displaced from the seat to thereby allow product to flow through the valve.

The stem may be coupled to the actuator to close the outlet when the actuator is actuated.

The latch mechanism may comprise a mechanical catch that is resiliently biased to engage when the dispensing device enters the charging configuration and thereby retain the dispensing device in the charging configuration.

The catch may be spring biased to engage, preferably with a retaining part. The catch and the retaining part with which it engages may be relatively rigid, compared with other parts of the dispensing device.

The latch mechanism may comprise an arm pivotally coupled to the actuator, with the catch provided at an end of the arm.

The latch mechanism may be configured so that the latch mechanism is released automatically upon expansion of the metering chamber to the expanded configuration.

The the arm and the metering chamber may be arranged such that, when the metering chamber expands to its expanded configuration, a force is exerted on the arm, the force causing the catch to disengage. The force exerted on the arm may oppose and overcome the resilient biasing of the mechanical catch, thereby disengaging it.

The actuator may comprise a lever. The valve for closing the outlet is preferably coupled to the lever. The valve is preferably coupled to the lever proximate to a fulcrum of the lever. In particular, the valve is preferably coupled to the lever closer to the fulcrum than an actuation surface of the actuator is to the fulcrum. The actuation surface is a part of the actuator that is configured to be operated by a user of the dispensing device. In this way, a mechanical advantage provided by the lever can be used to operate the valve effectively while requiring less force to be exerted on the actuator by the user.

In some embodiments, the metering chamber comprises a flexible and/or extensible resilient wall. This may provide a simple and economical, yet effective metering chamber.

The wall may be self-biasing toward the contracted configuration.

Alternatively or in addition, the metering chamber may be resiliently biased toward the contracted configuration by other resilient biasing means, such as a spring.

A flexible and extensible resilient wall may define a balloon. A flexible resilient wall may define a bellows, for example in a concertina arrangement.

In some embodiments, the metering chamber comprises a piston chamber and a piston movable within the piston chamber to vary the volume. This may provide a strong, robust metering chamber, by reducing the need for parts to flex, or expand and contract, repeatedly.

The metering chamber preferably further comprises resilient biasing means, such as a spring, configured to resiliently bias the piston toward the contracted configuration of the metering chamber.

The dispensing device may further comprise at least one limiting element, configured to limit expansion or contraction of the metering chamber and thereby define at least one of the first predetermined volume and the second predetermined volume.

The limiting element may be adjustable to adjust at least one of the first predetermined volume and the second predetermined volume, to thereby vary the metered dose.

This can allow a variable, rather than a fixed, metered dose to be dispensed. The volume may be continuously adjustable, wherein substantially any dose-volume is selectable (up to the maximum capacity of the metering chamber) or discretely adjustable, wherein a finite set of dose-volumes are selectable.

The limiting element may comprise a stop for a piston, or a relatively rigid confining volume surrounding a flexible and/or extensible resilient wall.

According to another aspect of the invention, there is provided a method of using a dispensing device as summarized above, the method comprising:

actuating the actuator, to fill the metering chamber; and
releasing the actuator, to dispense the metered dose of product through the outlet.

The actuator may be released before or after the latch mechanism has been released. The metered dose is preferably only dispensed after the latch mechanism has been released.

The container may contain a cosmetic or personal care product and a propellant. The cosmetic or personal care product may comprise a foamable hair cosmetic product, such as a foamable shampoo or foamable conditioner.

The dispensing device is preferably suitable for dispensing a foam from a container that contains the foamable product and a propellant.

If the container has a male-type valve, the valve-element may be a valve-stem. If the container has a female-type valve, the valve-element may be a spring cup.

When the inlet of the dispensing channel bears against the valve-element to a sufficient extent, the discharge valve of the container opens, allowing the product to flow out of the container into the dispensing channel.

The dispensing channel may be somewhat flexible and resilient.

This can allow the inlet of the dispensing channel to be biased against the valve-element of the container by flexing of the dispensing channel. This may enable the outlet of the dispensing channel to remain static relative to the container, while the actuator is being actuated and the product is being dispensed.

The dispensing channel is preferably elastically deformable. The dispensing channel is preferably defined at least in part by a somewhat flexible resilient material, optionally a flexible resilient plastic material, such as a polyolefin. Most preferably, at least a part of the dispensing channel is formed of polypropylene.

The inlet and outlet of the dispensing channel may have different orientations. Optionally, the dispensing channel may include a bend or corner. In particular, the dispensing channel may include a bend or corner such that the outlet is oriented differently to the inlet. An angle between the inlet and outlet may be in the range 30° to 150°, preferably in the range 45° to 135°, more preferably in the range 60° to 120°. (Here, an angle of 0° would indicate that the inlet and outlet have the same orientation.)

The dispensing device may further comprise a shroud for concealing the dispensing channel when the dispensing device is attached to a container containing the product, wherein the position of the outlet of the dispensing channel is fixed relative to the shroud.

In particular, the outlet may remain stationary when the product is being dispensed or metered (or when the actuator is actuated). Moreover, the outlet may remain stationary when the inlet is displaced as the product is being dispensed or metered.

If the dispensing device comprises a shroud, the shroud may engage with the container.

If the outlet of the dispensing channel is fixed relative to the shroud, then the outlet is preferably also fixed relative to the container.

The foamable product may form a foam having a density in the range 0.4 to 0.5 $g/cm^3$ immediately after dispensing. The foam may have a density in the range 0.1 to 0.2 $g/cm^3$ one minute after being dispensed. Thus, the foam may continue to expand significantly for some time after it has been dispensed.

BRIEF DESCRIPTION OF THE DRAWINGS

The invention will now be described by way of example with reference to the accompanying drawings, in which.

DETAILED DESCRIPTION OF THE INVENTION

In the embodiments described below, the product to be dispensed is a foamable product. However, it will be understood that the scope of the invention is not limited to dispensing foams. Other products may also be dispensed, including liquids, gases, and colloids such as emulsions, gels, sols, liquid aerosols and solid aerosols.

Figure 1A:
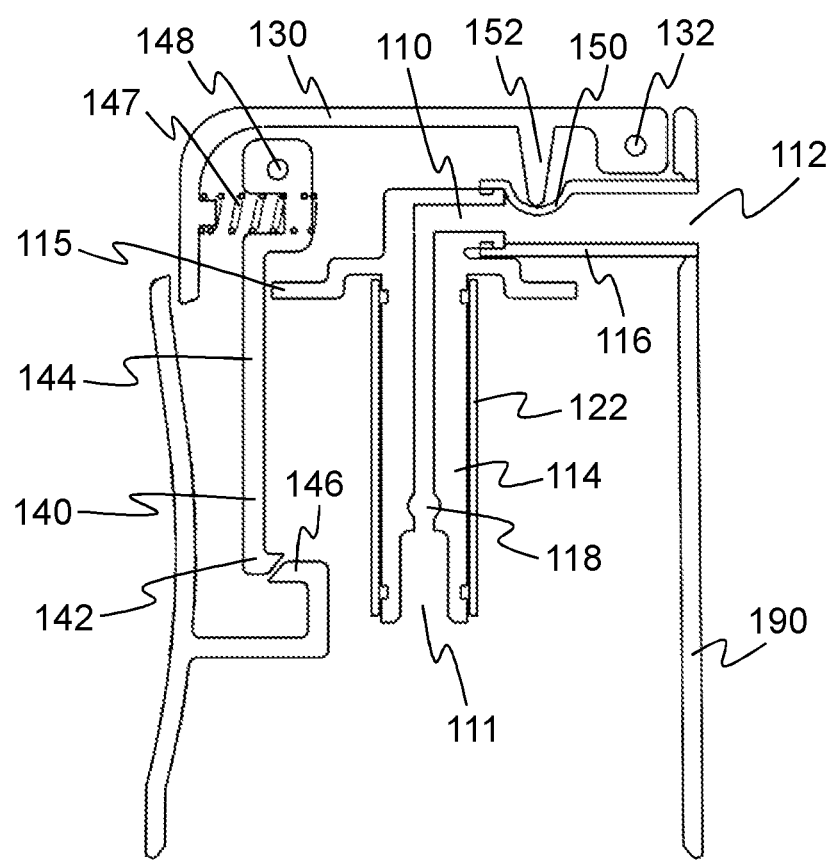
FIGS. 1A-1C are schematic illustrations of a dispensing device according to a first embodiment of the invention.
Figure 1B:
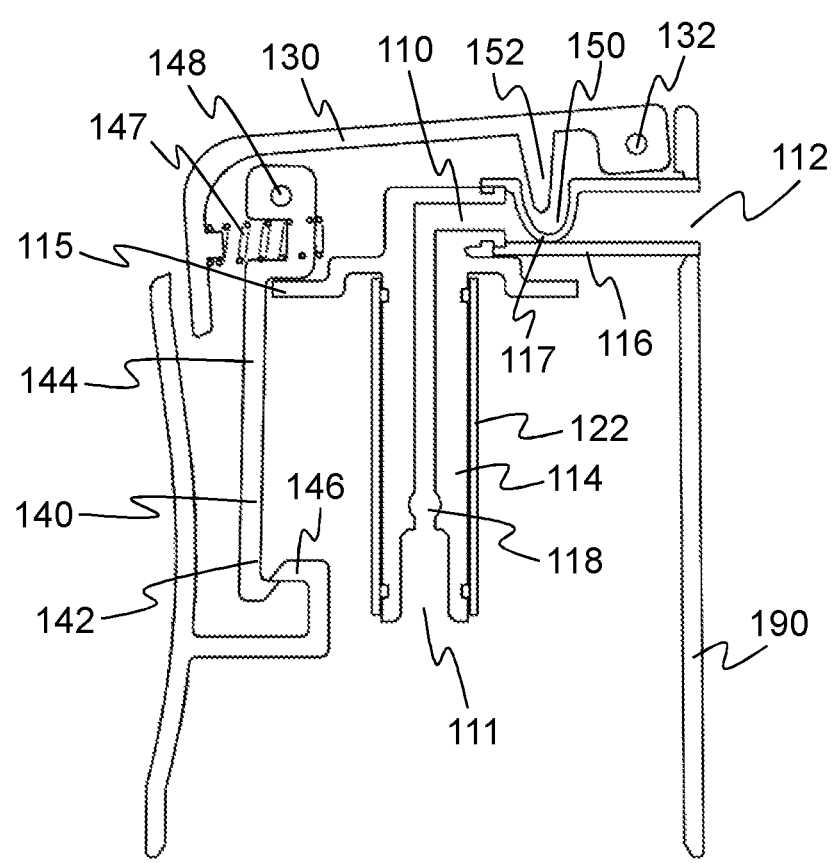
Figure 1C:
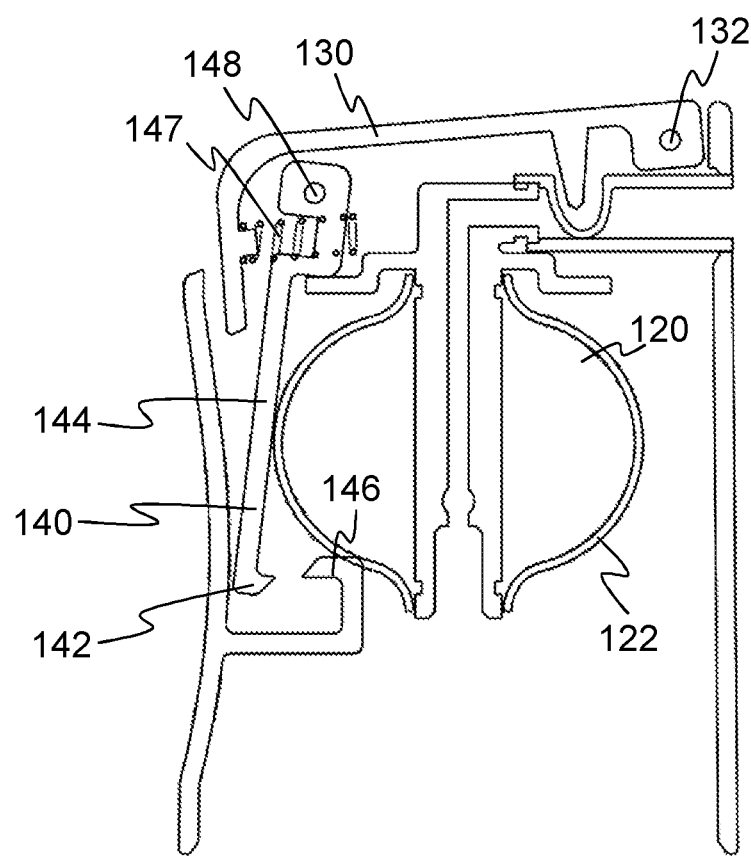

FIGS. 1A-1C illustrate a metered dispensing device according to a first embodiment of the invention. FIG. 1A shows the device in its rest position, before use. FIG. 1B shows the device immediately after it is put in its charging configuration; and FIG. 1C shows the device at the end of charging, when it is about to switch to the discharging configuration.

The dispensing device comprises a dispensing channel 110; a variable-volume metering chamber 120; an actuator 130; and a latch mechanism 140. The dispensing channel 110 has an inlet 111 for communicating with a valve-element of a container containing a foamable product. It also has an outlet 112 for dispensing the foamable product. The metering chamber 120 (best seen in FIG. 1C) is in fluid communication with the dispensing channel. In the present embodiment, this is achieved by providing a passage 118 through the wall of the dispensing channel. The variable-volume metering chamber 120 is arranged on the outside of the dispensing channel 110.

The metering chamber 120 has an expanded configuration in which it has a first, larger predetermined volume. This is shown in FIG. 1C. It also has a contracted configuration in which it has a second, smaller predetermined volume. This is shown in FIGS. 1A and 1B. The metering chamber 120 is biased toward its contracted configuration—that is, toward the smaller predetermined volume. In the example shown in the drawings, the smaller volume is close to zero—that is, the metering chamber is completely collapsed in the contracted configuration.

The dispensing device has a charging configuration, in which the outlet 112 is closed and the metering chamber 120 expands to its expanded configuration while being filled with foamable product from the container via the inlet 111. It also has a discharging configuration, in which the outlet 112 is open and the metering chamber 120 contracts to its contracted configuration while emptying through the outlet 112. This discharges a metered dose of the foamable product through the outlet 112, wherein the metered dose corresponds to the difference in volume between the first, larger volume of the metering chamber 120 and the second, smaller volume of the metering chamber.

The valve-element of the container (not shown) is open while the dispensing device is in the charging configuration and is closed while the dispensing device is in the discharging configuration. A valve 150 is provided near to the outlet 112, to close the outlet 112 during the charging phase of the dispensing device. The valve will be described in detail later, below.

The actuator 130 controls the dispensing device. In particular, actuation of the actuator 130, by pressing down on it, places the dispensing device in the charging configuration. Release of the actuator 130 allows the device to transition from the charging configuration to the discharging configuration. In this embodiment, the actuator 130 comprises a lever arranged to pivot about a fulcrum 132 above the outlet 112 of the dispensing channel 110.

The latch mechanism 140 ensures that the dispensing device is retained in the charging configuration until the metering chamber 120 has achieved the expanded configuration—that is, the latch mechanism 140 retains the dispensing device in the charging configuration until the variable-volume metering chamber 120 has filled to its first, larger predetermined volume. In the present embodiment, the latch mechanism 140 operates by holding the actuator 130 in place once it has been actuated. Even if the actuator 130 is released by the user, the latch mechanism 140 retains it in its actuated (depressed) position until charging has completed. Note that this is not essential. In other embodiments, the actuator may return to its starting position while the dispensing device is retained in the charging configuration by the latch mechanism in some other way.

In the present embodiment, the latch mechanism 140 comprises a mechanical catch 142. The catch 142 is resiliently biased by a spring 147 to engage with a retaining part 146 when the device enters the charging configuration. The catch 142 is provided at the lower end of an arm 144. At its upper end, the arm 144 is pivotally coupled to the actuator 130 by means of pivot 148. The coil spring 147 is compressed between the arm 144 of the latch mechanism 140 and the rear of the actuator 130 so that it urges the arm forwards towards the retaining part 146. Both the catch 142 and the retaining part 146 are provided with cooperating oblique surfaces. These cooperate to provide a camming action as the actuator 130 is depressed and the arm 144 coupled to it moves vertically downwards. As the catch 142 moves past the retaining part 146, the force exerted by the spring 147 pushes the arm 144 and associated catch 142 forwards to engage below the retaining part 146. An upper surface of the catch 142 engages with a lower surface of the retaining part 146. FIG. 1B shows the catch 142 engaged with the retaining part 146. In this state, the latch mechanism 140 prevents the actuator 130 from rising back to its rest position and accordingly keeps the dispensing device in the charging configuration.

In the present embodiment, the variable-volume metering chamber 120 is provided by a balloon. The balloon is defined by a flexible and extensible resilient wall 122, formed by a tube of elastomeric material. The tube forms a sheath around the outside of part of the dispensing channel. It covers the passage 118 through the wall.

At its top and bottom ends, the tube is sealed circumferentially around the exterior of the wall of the dispensing channel. Between the top and bottom ends, the tube is not attached to the wall of the dispensing channel. Thus, it can stretch, flex, and expand away from the dispensing channel wall during charging, thereby increasing the volume of the metering chamber 120. The metering chamber 120 is provided by a space between an external wall of the dispensing channel and the interior of the flexible, extensible, resilient wall 122.

As the balloon that forms the metering chamber 120 expands (approaching the larger, first predetermined volume), the wall 122 of the balloon comes into contact with the arm 144 of the latch mechanism (see FIG. 1C). The inflated balloon pushes the arm 144 rearwards, causing the catch 142 to disengage from the retaining part 146. This releases the latch mechanism 140, allowing the actuator 130 to rise and return to its rest position.

In the embodiment of FIG. 1, the dispensing channel 110 is defined by two parts. A relatively rigid tube 114 extends vertically upwards from the inlet 111. There is a right-angled bend at the top of this rigid tube. A flexible tube 116, formed of a flexible membrane, is coupled to the upper end of the rigid tube 114. The flexible tube 116 extends from the upper end of the rigid tube 114 to the outlet 112.

The flexible tube 116 forms part of the valve 150 of this embodiment. The valve 150 comprises the flexible membrane of the tube 116 and a gate member 152. The gate member has a closed configuration in which it presses the flexible membrane into the dispensing channel 110, to pinch or close off the dispensing channel near to the outlet 112. The gate member 152 has an open configuration in which it does not press the flexible membrane into the dispensing channel 110 (or presses it to a lesser extent), thereby allowing the flow of foamable product to the outlet 112.

The gate member 152 is formed integrally with the lever of the actuator 130. It projects downwardly from the actuator lever close to the fulcrum 132, above the outlet 112. Thus, when the user presses down on the actuator 130, the gate member is pressed downwards to interfere with the flexible membrane of the tube 116, so that a part 117 of the upper side of the tube 116 is brought into contact with the lower side of the tube, constricting the tube and closing off the outlet 112. This state is shown in FIG. 1B. It is further noted that if the user presses down near to the rear of the actuator 130, the lever provides a mechanical advantage, increasing the downward force exerted by the gate member on the tube 116 relative to the downward force exerted by the user on the actuator 130.

Also shown is a shroud 190 of the dispensing device. This is adapted to engage with the top of the container, in order to attach the dispensing device to the container. The shroud also conceals the internal components of the dispensing device, such as the dispensing channel 110. The shroud 190 may include a fastener for engaging with the container containing the foamable product. The fastener may be of any suitable type, including but not limited to an adhesive fastening or a snap-fit fastening. The container may be of any suitable type, including but not limited to conventional aerosol canisters for foamable products.

Prior to use, the dispensing device is mounted on the top of a container, with the inlet 111 of the dispensing channel 110 coupled to the valve-element of the container. Before use, the device is in its rest position, as shown in FIG. 1A. To use the dispensing device, the user actuates the actuator 130 by pressing downwards on the lever. This firstly closes off the outlet 112 of the dispensing channel 110 by means of the valve 150. The catch 142 of the latch mechanism then engages. At the same time, an elbow in the arm 144 of the latch mechanism 140 stops against a flange 115 of the rigid tube 114. The dispensing device is now in the charging configuration, shown in FIG. 1B.

In the charging configuration, the downward pressure exerted by the elbow of the arm 144 on the flange 115 presses the rigid tube 114 downwards onto the valve-element of the container (not shown). This opens the container-valve, and foamable product flows upwards into the dispensing channel 110 via the inlet 111. Since the valve 150 at the outlet 112 is closed, the foamable product is forced into the metering chamber 120, causing it to expand. The force to do this is provided by the propellant in the container. Note that the device remains in the charging configuration, with the valve of the container open, and the metering chamber filling with foamable product, even if the user removes his/her finger from the actuator 130. The latch mechanism 140 holds the device in the charging configuration (and, in this embodiment, keeps the actuator lever depressed).

When the metering chamber 120 is full, the wall 122 of the balloon presses on the arm 144 of the latch mechanism 140, pushing the catch 142 out of engagement with the retaining part 146 (see FIG. 1C). This releases the device from the charging configuration. No longer held down by the latch mechanism 140, the lever of the actuator 130 lifts up. This is achieved at least by the resilient restoring force exerted by the flexible tube 116 on the gate member 152, although other resilient biasing means may be provided alternatively or in addition. As the actuator 130 is released and rises, the downward force on the valve-element of the container is released, so that the container-valve is closed. As the actuator 130 continues to rise, the gate member 152 lifts, thereby opening the valve 150. This allows the metered dose of the foamable product that has been stored temporarily in the metering volume 120 to exit via the outlet 112. The foamable product is forced out through the outlet 112 by the resilient restoring force of the contracting walls 122 of the balloon. The device thus returns to the rest position shown in FIG. 1A.

Note that the user must release the actuator 130 before the dispensing device can transition from the charging configuration to the discharging configuration and dispense the metered dose of foamable product through the outlet 112. The user may release the actuator before or after the metering chamber has filled and the latch mechanism has been released. The description above assumes that the user releases the actuator before the metering chamber is full. In that case, the latch mechanism 140 is responsible for keeping the dispensing device in the charging configuration until the metering chamber 120 is fully charged. When the metering chamber is full, the latch mechanism releases automatically and the metered dose is immediately dispensed via the outlet 112. Alternatively, the user may still be pressing the actuator 130 at the time when the metering chamber reaches the expanded configuration and the latch mechanism 140 releases. In that case, the metered dose is not dispensed immediately. The device remains in the charging configuration, with the metering chamber full, the valve 150 in the dispensing channel 110 closed, the valve of the container (not shown) open, and the latch mechanism 140 released. This corresponds to the configuration illustrated in FIG. 1C. Only when the user releases the actuator 130 does the device switch to the discharging configuration—the valve of the container closes, the valve 150 in the dispensing channel opens, and the variable-volume metering chamber 120 returns to its contracted configuration, expelling the metered dose of foamable product through the outlet 112.

If the user is still pressing down on the actuator 130 at the moment when the metering chamber 120 reaches its expanded configuration, the release of the latch mechanism 140 creates a "click" sound, which the user can hear. Alternatively or in addition, the user may sense the vibration of the click through his/her hand gripping the dispensing device. The "click" acts as an indication that the metering chamber has reached the expanded configuration and is therefore fully charged. Thus, the user can use the sound or vibration of the click as a prompt to release the actuator. This can help to make the dispensing device particularly intuitive to use.

Suitable materials for fabricating the dispensing device will be apparent to those skilled in the art from the foregoing description. Preferably, the dispensing device is fabricated primarily from plastics and the plastic parts are manufactured by injection molding. Some parts should be relatively more rigid than others. For example, the catch 142 and retaining part 146 are preferably relatively rigid. Likewise, the actuator 130 and the rigid tube 114 that forms part of the dispensing channel 110 are also relatively rigid. The shroud 190 may also be relatively rigid. In the present embodiment, these relatively rigid parts are formed of polypropylene. Of course, polypropylene parts will have some flexibility, but they are more rigid than the flexible parts of the dispensing device. The notable flexible parts include the flexible membrane forming the flexible tube 116. This tube 116 forms part of the dispensing channel and also forms part of the valve 150 for closing the outlet of the dispensing channel. Another flexible part is the flexible, extensible, resilient wall 122 of the metering chamber 120. Both the tube 116 and the wall 122 may be formed of elastomeric materials. The wall 122 should be sufficiently resiliently extensible to allow the balloon forming the metering chamber 120 to inflate under the pressure of the foamable product and propellant in the container. In contrast, the flexible tube 116 is preferably not able to extend and inflate under the container-pressure, since to do so may interfere with the proper functioning of the valve 150. To make the tube 116 less easily extensible, it may be made from a stiffer elastomeric material than the wall 122. Alternatively, it may be made from a thicker piece of the same type of elastomeric material.

Figure 2A:
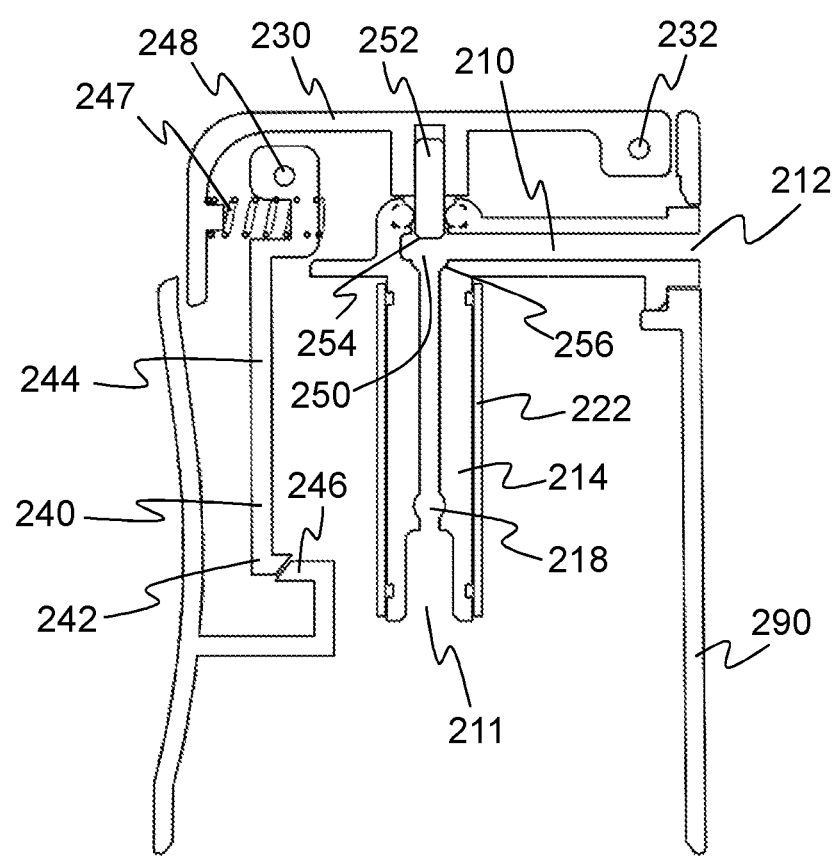
FIGS. 2A-2C are schematic illustrations of a dispensing device according to a second embodiment of the invention.
Figure 2B:
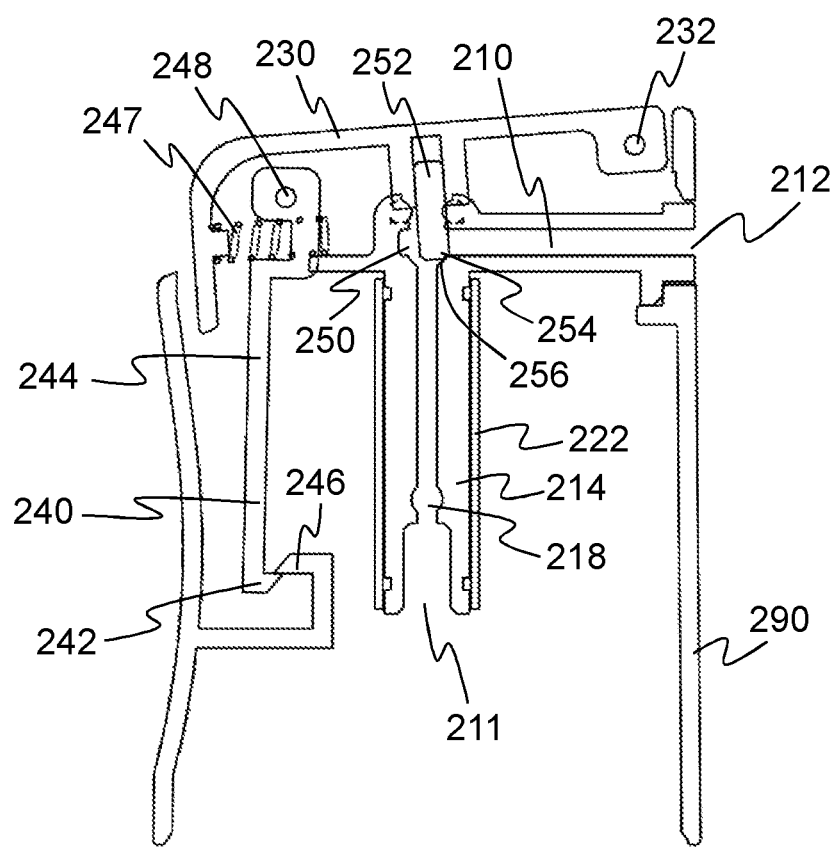
Figure 2C:
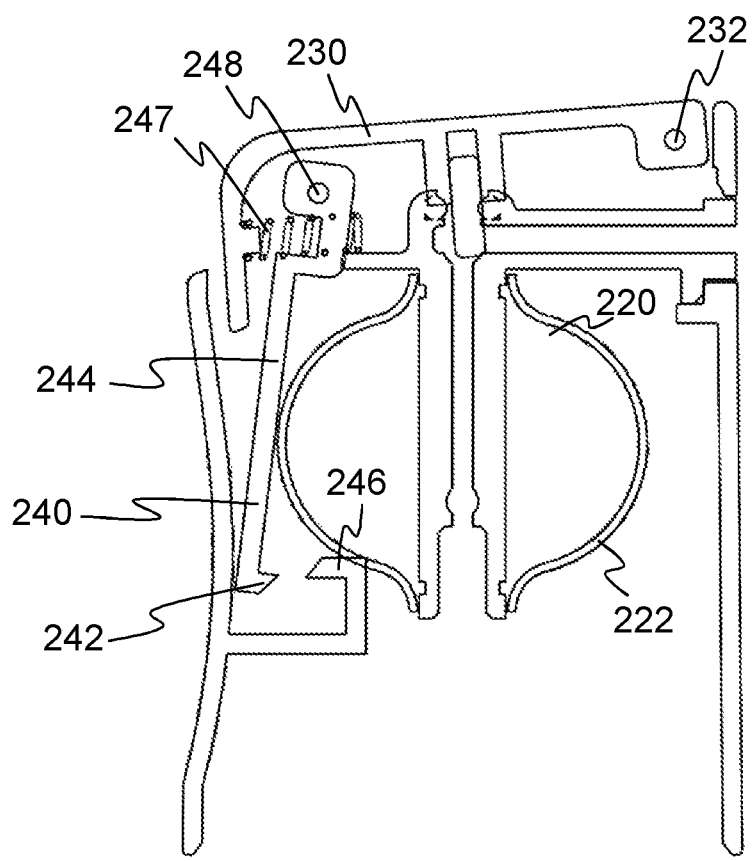

FIGS. 2A-2C illustrate a metered dispensing device according to a second embodiment of the invention. As before for FIG. 1, FIG. 2A shows the device in its rest position, before use; FIG. 2B shows the device immediately after it is put in its charging configuration; and FIG. 2C shows the device at the end of charging, just before it switches to the discharging configuration.

The dispensing device of the second embodiment is in many ways similar to that of the first embodiment. The corresponding features have been given corresponding reference numerals, replacing the reference numerals 1xx for the first embodiment with corresponding numerals 2xx. The differences between the two embodiments will now be described. Apart from the features specifically discussed below, it may be assumed that all other features are substantially identical to their counterparts in the first embodiment. For the sake of clarity and brevity, we will omit a repeated discussion of these common features.

The second embodiment differs from the first embodiment in the way in which the outlet 212 is closed off while the dispensing device is in the charging configuration. The device of the second embodiment includes a valve 250 comprising a stem or pin 252. A seat 256 is provided inside the dispensing channel 210, configured to receive a foot 254 of the stem 252 and thereby close the dispensing channel 210.

The stem 252 is connected to the actuator 230. It may be formed integrally with the actuator lever (like the gate element 152 in the first embodiment) but, in the present example, it is formed as a separate part and mounted in a recess formed in the underside of the actuator lever. The stem 252 is arranged to project into the dispensing channel 210. In the example shown in FIG. 2, it enters the dispensing channel at a right-angled bend, where the vertical channel rising from the inlet 211 turns into a horizontal channel to the outlet 212. The seat 256 is formed by a lip in this bend. In order to close the valve 250, the stem 252 is pushed downwards into the dispensing channel 210, so that the foot 254 engages with the seat 256 and the stem 252 blocks the channel. This is illustrated in FIG. 2B. As shown in this drawing, the stem 252 need not travel directly vertically downwards—it may engage with the seat 256 at a slight angle. As will be apparent to those skilled in the art, there are various ways of arranging the stem and the seat. Any suitable design can be adopted, provided it ensures good engagement and sealing.

The dispensing channel 210 in the second embodiment is defined by a single unitary piece 214, forming a vertical tube and a horizontal tube, which meet at the bend where the valve 250 is provided. This single unitary piece 214 can be formed from polypropylene by injection molding, similarly to the rigid tube 114 in the first embodiment.

The principles of operation of the dispensing device according to the second embodiment are the same as those for the first embodiment.

Embodiments of the invention operate to meter a product by volume, since the metered dose is determined by the difference between the volume of the metering chamber 120, 220 in its contracted configuration and the volume in its expanded configuration. This volumetric metering has been found to be sufficiently accurate for dispensing typical products of interest, such as foamable personal care or cosmetic products. In such applications, the user is typically quite tolerant of slight variations in the quantity of product dispensed. The user might not notice small variations or, even if they are noticed, may consider them acceptable. Therefore, it is generally not essential that the metered dose consistently contains an accurately measured mass of material.

The volume to which the metering chamber 120, 220 expands may be influenced by the pressure developed in the container of foamable product. This, in turn, can affect the volume of product contained in a given metered dose. The pressure in the container may depend on factors such as the ambient temperature and quantity of product (and propellant) remaining in the container. For example, the pressure of the container may decline over time as more of the contents are dispensed. This may result in the volume of the metered dose dispensed reducing over time. However, in general, it has been found that the variation is not so serious as to cause user dissatisfaction.

The mass of material in a metered dose may vary with the volume of the dose and may additionally vary to some extent independently of the volume, depending on the density of the dispensed product. Again, this variation is generally not so significant as to undermine user satisfaction.

The embodiments described above are just two examples of how to put the principles of the invention into practice. Many variations are possible.

In both of the embodiments discussed above, the metering chamber is self-biasing to the contracted configuration, since tension in the flexible, extensible, resilient wall 122, 222 causes the chamber to the contract. However, in other embodiments, the metering chamber may comprise separate biasing means, such as a spring, to return the metering chamber to its contracted configuration. Such separate biasing means may be provided as well as or instead of self-biasing by the walls of the chamber. For example, in one embodiment, the metering chamber comprises a bellows defined by a flexible resilient wall in a concertina arrangement. The wall may be partly self-biasing to the contracted configuration. This may be assisted by an external spring, which helps to push the bellows into the collapsed configuration. Of course, in other embodiments the separate biasing means (such as a spring) may be internal to the metering chamber rather than external to it.

In the embodiments discussed above, the metering chamber comprises a flexible (and extensible) resilient wall defining a balloon. This is of course not essential. In other embodiments, the metering chamber may comprise one or more piston chambers with one or more respective pistons movable within the piston chambers to vary the volume. A piston may be biased to the contracted configuration of the metering chamber by resilient biasing means such as a coil spring. The coil spring may be internal or external to the chamber.

In the embodiments discussed above, certain parts of the dispensing device were described as "relatively rigid". This does not mean that they are completely inflexible, merely that they are less flexible than some other parts of the device. For example, parts forming the dispensing channel 110, 210 may be described as "relatively rigid" even though they are designed to flex in order to maintain contact between the inlet 111, 211 of the dispensing channel and the valve-element of the container, or in order to press down on the valve-element in order to open the container-valve. Parts that are described as "relatively rigid" may suitably be formed from polyolefin materials, such as polypropylene, as exemplified already above. These are relatively more rigid than other materials used in the construction, such as elastomers.

In the embodiments pictured in FIGS. 1 and 2, it is assumed that the expansion of the metering chamber 120, 220 is effectively limited by the vapor pressure of the propellant in the container. In other words, the balloon ceases to expand when a state of equilibrium is reached between the pressure of the foamable product filling the metering chamber and the restoring tension in the walls 122, 222. For this to work, the structure and materials of the metering chamber should be designed for a specific intended propellant vapor pressure. If the dispensing device is used with a container having a different propellant vapor pressure, the metering chamber will expand to a different extent, leading to a different size of metered dose.

This is not the only way to determine the expanded volume of the metering chamber. In some embodiments, the dispensing device may include a limiting element that is arranged to limit the expansion of the metering chamber to a predetermined maximum size. The limiting element could comprise a barrier or cage that contains the balloon illustrated in FIGS. 1C and 2C. In such an embodiment, the balloon would expand under the pressure of the propellant until the balloon was trapped against the inside of the cage. No further expansion would be possible, irrespective of the propellant pressure.

Similarly, a predetermined minimum size of the metering chamber could be fixed by a limiting element, such as a frame inside the balloon. In this case, the volume of the metering chamber in the contracted configuration would be greater than zero.

In other embodiments, such as those using a piston or bellows rather than a balloon, other types of limiting element may be used. For example, the expansion or contraction of a bellows could be arrested by a simple stop. Likewise, the range of positions of a piston in a piston chamber could be limited by one or more stops.

Of particular utility are embodiments in which the limiting element or elements are adjustable. For example, the limiting element may comprise a cage with the interior dimensions of the cage adjustable by moving one of its walls. For a piston or bellows wherein the limiting element is a stop, the stop may be movable between different positions to arrest the movement of the piston at those positions. These embodiments can enable the size of the metered dose to be varied by the user, by adjusting the limiting element. A control, such as a knob, dial, slider, or button, may be provided on the exterior of the dispensing device, to allow the user to adjust the position or configuration the limiting element.

One type of latch mechanism 140, 240 has been described in the context of the first and second embodiments. However, it is possible to implement latch mechanisms of many other kinds. These may include but are not limited to: other mechanical latch mechanisms; electrical, electronic, or electromechanical latch mechanisms; and magnetic latch mechanisms.

In the two embodiments described above, the actuator is arranged so that actuation of the actuator places the dispensing device in the charging configuration. This may be preferable, but is not always essential. Alternatively or in addition, in some embodiments, actuation of the actuator may place the dispensing device in the discharging configuration. The device may enter the charging configuration automatically. This may happen, for example, immediately after a dispensing event (that is, at the end of the discharging phase), or in response to motion of the dispensing device when the user picks up the container of product.

Other variations will be apparent to those skilled in the art.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A dispensing device for dispensing a metered dose of a product, the dispensing device comprising:
    a dispensing channel, the dispensing channel having:
        an inlet for communicating with a valve-element of a container containing the product; and
        an outlet for dispensing the product; and
    a variable-volume metering chamber in fluid communication with the dispensing channel,
    the metering chamber) having an expanded configuration in which it has a first predetermined volume and a contracted configuration in which it has a second predetermined volume, wherein the first predetermined volume is larger than the second predetermined volume, the metering chamber being biased toward the contracted configuration,
    wherein the dispensing device has:
        a charging configuration in which the outlet is closed and the metering chamber is configured to expand to its expanded configuration while receiving product through the inlet; and
        a discharging configuration in which the outlet is open and the metering chamber is configured to contract to its contracted configuration while expelling the received product through the outlet, thereby dispensing a metered dose of product, the metered dose being determined by a difference between the first predetermined volume and the second predetermined volume,
    the dispensing device further comprising an actuator,
    the dispensing device further comprising a latch mechanism, configured to retain the dispensing device in the charging configuration until the metering chamber attains its expanded configuration.

2. The dispensing device of claim 1, comprising a valve between the metering chamber and the outlet, for closing the outlet in the charging configuration of the dispensing device.

3. The dispensing device of claim 2, wherein the valve comprises:
    a flexible membrane forming at least a portion of a wall of the dispensing channel; and
    a gate member, the gate member having:
        a closed configuration in which it presses the flexible membrane into the dispensing channel to thereby obstruct the flow of product; and
        an open configuration, in which product can flow through the valve.

4. The dispensing device of claim 2, wherein the valve comprises:
    a stem arranged to project into the dispensing channel, the stem having a foot; and
    a seat for the foot inside the dispensing channel,
    the stem having:
        a closed configuration, in which the foot projects into the dispensing channel and engages with the seat to thereby obstruct the flow of product to the outlet; and
        an open configuration, in which the foot is displaced from the seat to thereby allow product to flow through the valve.

5. The dispensing device of claim 1, wherein the latch mechanism comprises a mechanical catch that is resiliently biased to engage when the dispensing device enters the charging configuration and thereby retain the dispensing device in the charging configuration.

6. The dispensing device of claim 5, wherein the latch mechanism comprises an arm pivotally coupled to the actuator, with the catch provided at an end of the arm.

7. The dispensing device of claim 1, wherein the latch mechanism is configured so that the latch mechanism is released automatically upon expansion of the metering chamber to the expanded configuration.

8. The dispensing device of claim 6, wherein the arm and the metering chamber are arranged such that, when the metering chamber expands to its expanded configuration, a force is exerted on the arm, the force causing the catch to disengage.

9. The dispensing device of claim 1, wherein the actuator comprises a lever.

10. The dispensing device of claim 1, wherein the metering chamber comprises a flexible and/or extensible resilient wall.

11. The dispensing device of claim 10, wherein the wall is self-biasing toward the contracted configuration.

12. The dispensing device of claim 1, wherein the metering chamber comprises a piston chamber and a piston movable within the piston chamber to vary the volume.

13. The dispensing device of claim 1, further comprising at least one limiting element, configured to limit expansion or contraction of the metering chamber and thereby determine at least one of the first predetermined volume and the second predetermined volume.

14. The dispensing device of claim 13, wherein the limiting element is adjustable to adjust at least one of the first predetermined volume and the second predetermined volume, to thereby vary the metered dose.

15. A method of using the dispensing device of claim 1, the method comprising:
   actuating the actuator, to fill the metering chamber; and
   releasing the actuator, to dispense the metered dose of product through the outlet.

* * * * *